May 22, 1934.    H. W. ABBOTT    1,959,848
DYNAMO-ELECTRIC BRUSH CABLE
Filed Feb. 7, 1933
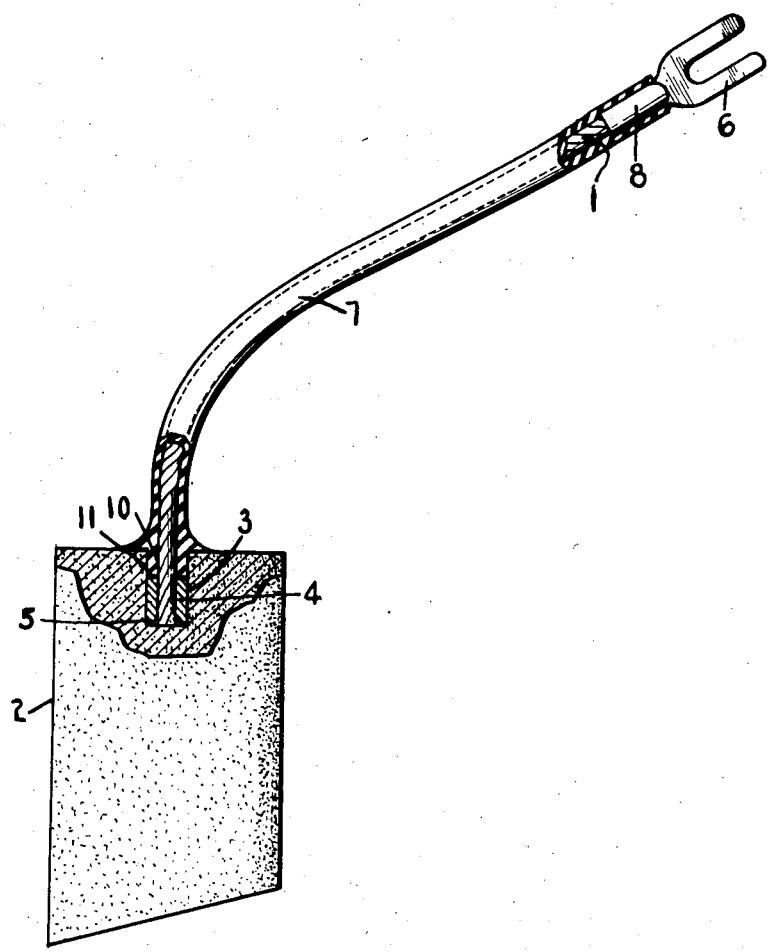
INVENTOR
Harald W. Abbott
BY Ira J. Adams
ATTORNEY Patented May 22, 1934

1,959,848

UNITED STATES PATENT OFFICE 1,959,848

DYNAMO-ELECTRIC BRUSH CABLE

Harald W. Abbott, Saint Marys, Pa., assignor to Speer Carbon Company, a corporation of Pennsylvania Application February 7, 1933, Serial No. 655,592

2 Claims. (Cl. 171—326)

This invention relates to brushes for dynamo-electric machines having flexible shunts or "pig tail" cables attached thereto.

An object of the invention is to protect the flexible cable from corrosive atmospheres and more particularly to provide a coating of rubber compound which is applied to the cable and junction points and vulcanized or otherwise set after the connection is made between the cable and terminal clip.

Further objects of the invention will appear in the following description, reference being had to the drawing in which the single figure illustrates a dynamo-electric brush with the attached cable and protecting covering. There are various ways of connecting the flexible cable to the carbon or graphite brush 2 but I have illustrated only one of the ways. In the particular embodiment shown on the drawing the brush 2 has a hole 3 drilled in the top slightly larger than the cable. The end of the cable 1 is placed in this hole and powdered metal or amalgam is tamped around the metal inside the hole, as shown at 4. The compacted metal securely holds the cable in the brush and makes a good electrical connection. Usually the end of the cable 1 is frayed out somewhat at 5 to further strengthen the connection. The clip 6 is usually attached to the end of the cable after it is secured to the brush. All of these features are old and well known and form no part of my invention except in the combination set forth in the claims. Heretofore cables attached to brushes of dynamo electric machines used where there are corrosive atmospheres of chlorine, sulphur fumes, etc. are eaten away and the individual strands slowly severed. This increases the electrical resistance of the shunt connection and finally severs the cable altogether or weakens it so that it is broken by bending stresses to which brush connections are always subject in use. There have been attempts to protect brush connections by plating the cables with cadmium, tin, lead or some other metal, and in some cases the cable has been made of nickel wire or ribbon. All these past efforts to overcome the difficulty have not been satisfactory and I have devised a way to overcome the corrosive effects in a very effective manner at comparatively low cost, as will now be disclosed.

After the cable is attached to the brush and the clip by any means, the one illustrated being by way of example only, coatings of plastic rubber compound 7 are applied to the cable so as to entirely surround it and also to extend up over the shank 8 of the clip 6 and at 10 into the depression 11 in the top of the brush.

The invention is not limited to any particular way of applying the coating or to any particular number of coats, but by way of example, I will say that I have secured excellent results by applying a coating of liquid rubber compound such as that known under the trade name of "Colvulc Liquid Rubber" and then letting it dry for about a half hour. After this two coats of rubber compound are applied, allowing about one hour between coats. I have secured good results by using for these last two coats a material known under the trade name of liquid "Sealvulc". The applied coats of liquid rubber are self vulcanizing and during the lapse of time mentioned produce a protecting covering that is vulcanized to the surface of the flexible cable 1 and to the junction of the cable, as at 10 and to the shank 8 of the clip 6.

It is an important feature of my invention that the rubber coating is applied after the cable is attached to the slip and to the brush as it is only in this way that the contacts with these can be coated with the rubber.

While it is not in all cases necessary, I have secured better results by first coating the cable 1 and the shank 8 of the terminal clip 6 with any of the so-called metal cements found on the market. This gives a rough surface or "tooth" to the metal to permit the rubber to adhere with greater tenacity. When using this metal cement I permit it to dry about a half hour before applying the first coating of liquid rubber.

The particular rubber compounds mentioned have been by way of example in order to give a practical disclosure of the invention and it will be understood that many other compounds or similar material may be used and vulcanized to the parts in different ways and the invention is not to be limited to any particular material or method of applying the same.

I have used another method for coating the cable and joints with excellent results. In this method I make an emulsion of water and rubber latex of the usual sort. The end of the terminal clip is coated with wax or some non-conductor and the cable is inserted clip downward into the latex until the top of the brush is slightly in the rubber emulsion. One terminal of a source of electric current is then connected to the brush and the other one to the metal container for the emulsion or to a separate electrode therein. This plates the rubber out on the cable, the shank of the clip and the top of the brush. After a sufficient coat is produced the brush and cable are removed and dried and vulcanized if desired.

In some cases I have tinned the flexible cable as it better resists the chemical action of the rubber though as long as the cable operated in practice below 110° C. the copper is not appreciably attached by the rubber.

Having disclosed my invention, what I claim is:

1. A carbon brush, a flexible cable secured thereto, and a protective coating of rubber material entirely covering said cable and resiliently fitting against the carbon surface surrounding the junction points between the brush and cable.

2. A carbon brush, a flexible cable secured thereto, and a protective coating of rubber vulcanized to the cable and to the surface of the carbon brush surrounding the junction point with the cable.

HARALD W. ABBOTT.